United States Patent
Chavan et al.

(10) Patent No.: US 12,060,518 B2
(45) Date of Patent: Aug. 13, 2024

(54) COMPOSITIONS AND METHODS FOR INHIBITING SHALE AND PREVENTING SHALE ACCRETION

(71) Applicant: HALLIBURTON ENERGY SERVICES, INC., Houston, TX (US)

(72) Inventors: Sandeep Chavan, Mumbai (IN); Jeffrey J. Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 17 days.

(21) Appl. No.: 17/649,077

(22) Filed: Jan. 27, 2022

(65) Prior Publication Data

US 2023/0002664 A1 Jan. 5, 2023

Related U.S. Application Data (60) Provisional application No. 63/217,438, filed on Jul. 1, 2021.

(51) Int. Cl.
*C09K 8/12* (2006.01)
*E21B 21/06* (2006.01)

(52) U.S. Cl.
CPC .......... *C09K 8/12* (2013.01); *E21B 21/062* (2013.01); *C09K 2208/12* (2013.01)

(58) Field of Classification Search
CPC .................................................. C09K 7/02
See application file for complete search history.

(56) References Cited

U.S. PATENT DOCUMENTS

| | | |
|---|---|---|
| 7,087,554 B2 | 8/2006 | Youngson et al. |
| 7,549,474 B2 | 6/2009 | Valenziano et al. |
| 7,786,049 B2 | 8/2010 | Temple et al. |
| 9,969,921 B2 * | 5/2018 | Wang ........................ C09K 8/20 |
| 2004/0204323 A1 | 10/2004 | Temple et al. |
| 2016/0215196 A1 * | 7/2016 | Wang ..................... C09K 8/588 |
| 2019/0023972 A1 | 1/2019 | Lei et al. |

FOREIGN PATENT DOCUMENTS

| | | | |
|---|---|---|---|
| CN | 104559969 A | 4/2015 | |
| CN | 110760299 A | 2/2020 | |
| EP | 0 668 339 A1 | 8/1995 | |
| GB | 2267921 * | 6/1992 | ............... C09K 7/02 |
| GB | 2267921 A | 12/1993 | |
| WO | WO 96/04348 A1 | 2/1996 | |
| WO | 2015034601 A1 | 3/2015 | |

OTHER PUBLICATIONS

Sigma-Aldrich, PVP Safety Data Sheet, 2023.*
Kumar et al. Natural and Synthetic Biomedical Polymers, 2014.*
International Search Report and Written Opinion issued by the Korean Intellectual Property Office for International Application No. PCT/US2022/070401 dated May 9, 2022. (8 pages).
Foreign Communication from Related Application—United Kingdom Combined Search and Examination Report, Application No. GB 2204364.0, dated Sep. 28, 2022, 5 pages.

* cited by examiner

*Primary Examiner* — Angela M DiTrani Leff
*Assistant Examiner* — Avi T Skaist
(74) *Attorney, Agent, or Firm* — Conley Rose, P.C.; Rodney B. Carroll (57) ABSTRACT

Methods of treating a subterranean formation including shale include preparing a treatment fluid by mixing an aqueous base fluid and a dry polyvinyl pyrrolidone (PVP) in flake or powder form having a molecular weight between about 500,000 and about 2,000,000 and introducing the treatment fluid in the subterranean formation.

18 Claims, 2 Drawing Sheets

Fig. 1

Fig. 2

COMPOSITIONS AND METHODS FOR INHIBITING SHALE AND PREVENTING SHALE ACCRETION

CROSS-REFERENCE TO RELATED APPLICATIONS

This application claims priority to U.S. Provisional Application No. 63/217,438 filed Jul. 1, 2021, entitled "Compositions and Methods for Inhibiting Shale and Preventing Shale Accretion," the disclosure of which is hereby incorporated by reference in its entirety.

BACKGROUND

The present disclosure relates generally to compositions and methods for inhibiting shale and preventing shale accretion. In particular, the present disclosure relates to the use of dry polyvinyl pyrrolidone (PVP) in the form of flakes or powder having a middle range molecular weight in treatment fluids for subterranean formations.

A drilling fluid used in connection with drilling a well in a subterranean formation is any number of fluids (gaseous or liquid) and mixtures of fluids and solids (as solid suspensions, mixtures and emulsions of liquids, gases and solids) used in operations to drill well bores into subterranean formations. Drilling fluids are used to cool the drill bit, lubricate the rotating drill pipe to prevent it from sticking to the walls of the well bore, prevent blowouts by serving as a hydrostatic head to counteract the sudden entrance into the well bore of high pressure formation fluids, and remove drill cuttings from the well bore.

During drilling of subterranean well bores, it is not uncommon to encounter strata comprising reactive shales. As referred to herein, the term "shale" is understood to mean materials such as certain types of clays (for example, bentonite) and related subterranean materials that may "swell," or increase in volume, when exposed to water. Reactive shales may be problematic during drilling operations because of their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface. Degradation of drilled cuttings prior to their removal at the surface greatly prolongs drilling time, because shale particles traveling up the well bore break up into smaller and smaller particles, which increasingly exposes new surface area of the shale to the drilling fluid, which leads to still further absorption of water, and further degradation.

Shale disintegration may also adversely impact "equivalent circulation density" ("ECD"). ECD is affected by the solids content of the drilling fluid, which increases if surface solids control equipment cannot remove shale from the drilling fluid. Plastic viscosity (an indicator of size and quantity of solids) is an important parameter in determining drilling rate. Maintenance of appropriate ECD is extremely important in situations where a well is being drilled wherein a narrow tolerance exists between the weight of the drilling fluid needed to control the formation pressure, and the weight of the drilling fluid that will fracture the formation. In such circumstances, minimizing shale degradation provides improved control of the density of the drilling fluid, and enhances the probability of successfully drilling a well bore.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such extent that the well bore will collapse. Degradation of the shale may also interrupt circulation of the drilling fluid, cause greater friction between the drill string and the well bore, or cause the drill string to become stuck in the well bore. Accordingly, the complications associated with shale swelling during drilling may greatly increase the cost of drilling.

A traditional method of inhibiting shale swelling during drilling to attempt to minimize such complications has been to use an oil-based drilling fluid as opposed to an aqueous-based drilling fluid. However, oil-based drilling fluids are often environmentally undesirable because they may be toxic to marine plants and animals. Accordingly, environmental regulations enacted by numerous countries have curtailed the use of oil-based drilling fluids. Consequently, water-based drilling fluids are preferred because they likely have a more benign effect on the environment than oil-based drilling fluids. However, the use of aqueous drilling fluids results in added complications, due to interactions between components of the subterranean formation such as reactive shales and the aqueous fluids.

To counteract the propensity of aqueous drilling fluids to interact with reactive shales in the formation, a shale inhibiting component may be added to the aqueous drilling fluid. Amphoteric materials are one type of water-based shale inhibitor that have been used in the past. Amphoteric materials are believed to function by attaching to the shale substrate, thus preventing water ingress. Amphoteric inhibitors are environmentally undesirable, however, especially in heavily regulated areas, because they demonstrate low biodegradability and high toxicity. Potassium chloride is another material that has been utilized as a shale inhibitor. Although potassium chloride is widely used as a shale inhibitor in the North Sea, it is considered to be only moderately effective at inhibiting the swelling of shale. Furthermore, potassium chloride is environmentally unacceptable in other areas of the world. For example, potassium chloride is unsuitable for use in regions such as the Gulf of Mexico, because its concentration of potassium ions is troublesome for certain types of marine life, e.g., shrimp. Potassium chloride is also disfavored in certain regions, such as the Middle East, where wells are drilled in close proximity to aquifers due to concerns that the potassium chloride will contaminate the aquifer. Polyglycols have also been used as shale inhibitors in water-based drilling fluids but have not reached satisfactory inhibition levels. Partially hydrolyzed polyacrylamides ("PHPA") have also been utilized in many regions, but these do not prevent shale accretion in many cases, have been found to cause formation damage, and are environmentally undesirable.

PVP-based shale inhibitors may be used but are provided as dilute solutions of PVP in water. As such, large quantities of liquid are required to supply ongoing operations at remote drilling locations. Moreover, supply and storage are difficult to manage when shipping liquid PVP internationally and due to potential delays from carriers. Liquid PVP solutions at high molecular weight (e.g., 2 million to 3 million) pose challenges to industrial processing methods used to convert the polymer component into dry form. Elevated viscosity (expressed as a K-number) forces further dilution of the liquid form in order to effectively spray dry the material, and this results in high energy consumption and poor process yield.

Thus, there is a continuing need for improved compositions and methods for inhibiting shale and preventing shale accretion.

BRIEF DESCRIPTION OF THE DRAWINGS

The following figures are included to illustrate certain aspects of the present invention and should not be viewed as an exclusive embodiment. The subject matter disclosed is capable of considerable modification, alteration, and equivalents in form and function, as will occur to those of ordinary skill in the art and having the benefit of this disclosure.

FIG. 1 illustrates a land-based drilling and production system; and

FIG. 2 depicts a method of treating a subterranean formation including shale according to one or more embodiments of the present disclosure.

DETAILED DESCRIPTION

In one or more embodiments, a dry, middle range molecular weight PVP in the form of powder or flakes (the "dry PVP product") is used to inhibit or encapsulate shale, or to prevent shale accretion in a subterranean formation where reactive shales and clays may be present. In one or more embodiments, the dry PVP product has a molecular weight of about 500,000 to about 2,000,000. If the molecular weight is higher, the PVP polymer will require extensive efforts to convert it into flake or powder form. The high molecular weight solid powder also presents poor storage and packaging characteristics due to a very low bulk density. If the molecular weight is lower than about 500,000, the PVP loses its anti-accretion ability. The molecular weight of the dry PVP product is within a range where it may be dried by various methods but has sufficient molecular weight to inhibit shales and clays. As used herein, "inhibit shale" means to inhibit the tendency of shale to absorb water, and "accretion" refers to the mechanism by which partially hydrated cuttings stick to parts of the bottomhole assembly and accumulate as a compacted, layered deposit.

In one or more embodiments, methods are provided for treating subterranean formations using the dry PVP product. Such treatment operations can include, for example, drilling operations, stimulation operations, production operations, remediation operations, sand control treatments, and the like. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, acidizing operations, scale dissolution and removal operations, loss circulation operations, sand control operations, consolidation operations, anti-sludge operations, and the like.

The treatment fluids generally include an aqueous base fluid and the dry PVP product. In one or more embodiments, the treatment fluid includes a drilling fluid.

The aqueous base fluid in the treatment fluids can include fresh water, salt water (e.g., water containing one or more dissolved salts), brine, seawater, or any combination thereof. One of ordinary skill in the art with the benefit of this disclosure will recognize which types of aqueous base fluids are appropriate for a particular application.

In one or more embodiments, the dry PVP product is added directly to an aqueous treatment fluid for use in a subterranean formation. In one or more embodiments, the dry PVP product is added in an amount of about 0.04 pounds per barrel (ppb) to about 10 ppb to the treatment fluid, such as about 1 ppb to about 8 ppb.

Advantageously, this higher activity product can be sent to remote locations more easily than liquid PVP and used at 1/10th the amount needed previously for similar performance. The dry PVP product also allows for stronger additions of PVP to be made quickly and with less increase of viscosity in the fluid system. The dry PVP product further reduces logistical requirements, inventory space required, and heavy lifts at stock points and drilling locations. Along with safer handling, the dry PVP product presents a lower carbon footprint by utilizing about 2/3 less containers through global shipping lanes. In one or more embodiments, the dry PVP product offers 10 times the strength for shale inhibition compared to liquid PVP and presents fewer effects on fluid rheology, enabling ease of field maintenance and treatment.

In one or more embodiments, the treatment fluids may contain one or more salts. One of ordinary skill in the art with the benefit of this disclosure will recognize the need for caution when combining a salt with a treatment fluid for use in certain regions of the world where such use of a salt may be subject to environmental restrictions. One of ordinary skill in the art with the benefit of this disclosure will also recognize where it is desirable to use a dense brine rather than achieve density with a solid weighting agent. Where the use of a salt is permissible, a variety of salts may be used. Examples of suitable salts include potassium chloride, potassium acetate, sodium chloride, potassium formate, potassium carbonate, calcium chloride, and calcium bromide. In one or more embodiments, a mixture of suitable salts may be used. In one or more embodiments, suitable salts are present in the treatment fluids in an amount in the range of from about 5 ppb to about the salt saturation limit of the treatment fluid.

In one or more embodiments, other additives suitable for use in subterranean well bore operations also may be present in the treatment fluids if desired, including antifoams, biocides, bridging agents, corrosion control agents, dispersants, flocculants, fluid loss additives, foamers, $H_2S$ scavengers, lubricants, oxygen scavengers, scale inhibitors, viscosifiers, and weighting agents. One of ordinary skill in the art with the benefit of this disclosure will be able to determine if any of such additives are needed for a given application.

In one or more embodiments, the present methods include preparing a treatment fluid (e.g., a drilling fluid) by mixing an aqueous base fluid and a dry PVP in flake or powder form having a molecular weight between about 500,000 and 2,000,000; and introducing the treatment fluid in a subterranean formation. The PVP is added to the treatment fluid in dry rather than liquid form (e.g., PVP mixed with water). The term "introducing" or its variations, as used herein, includes pumping, injecting, pouring, releasing, displacing, spotting, circulating, or otherwise placing a fluid or material within a well, wellbore, or subterranean formation using any suitable manner known in the art.

The present methods may be utilized in a variety of subterranean operations that involve subterranean drilling. Examples of suitable subterranean drilling operations include, but are not limited to, water well drilling, oil/gas well drilling, utilities drilling, tunneling, construction/installation of subterranean pipelines and service lines, and the like. These subterranean drilling operations may be utilized to drill a well bore in a subterranean formation, or to stimulate the production of fluids from a subterranean formation, as well as or for a number of other purposes. In one or more embodiments, the present disclosure provides methods of drilling at least a portion of a well bore to penetrate a subterranean formation. In those embodiments, a drilling fluid may be placed in contact with a drill bit and a subterranean formation. In certain embodiments, the drilling fluid may include the dry PVP product before it is introduced into the well bore. In other embodiments, the dry PVP product may be added to a drilling fluid that includes an aqueous base fluid already resident within the well bore.

Figure 1:
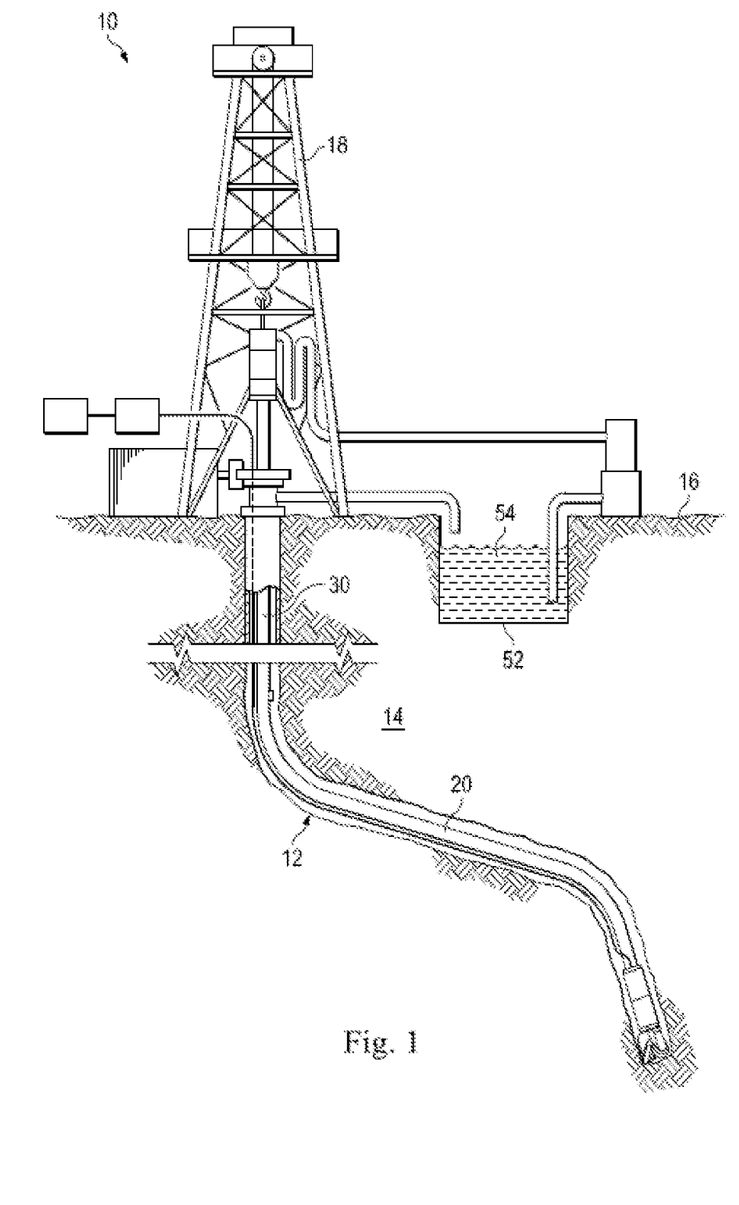

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described herein. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in well bore operations, including without limitation, fracturing fluid, drilling fluid, spacer fluid, slurry, cement composition, acidizing fluid, liquid water, steam, hydraulic fracturing fluid, or some other type of fluid.

Figure 2:
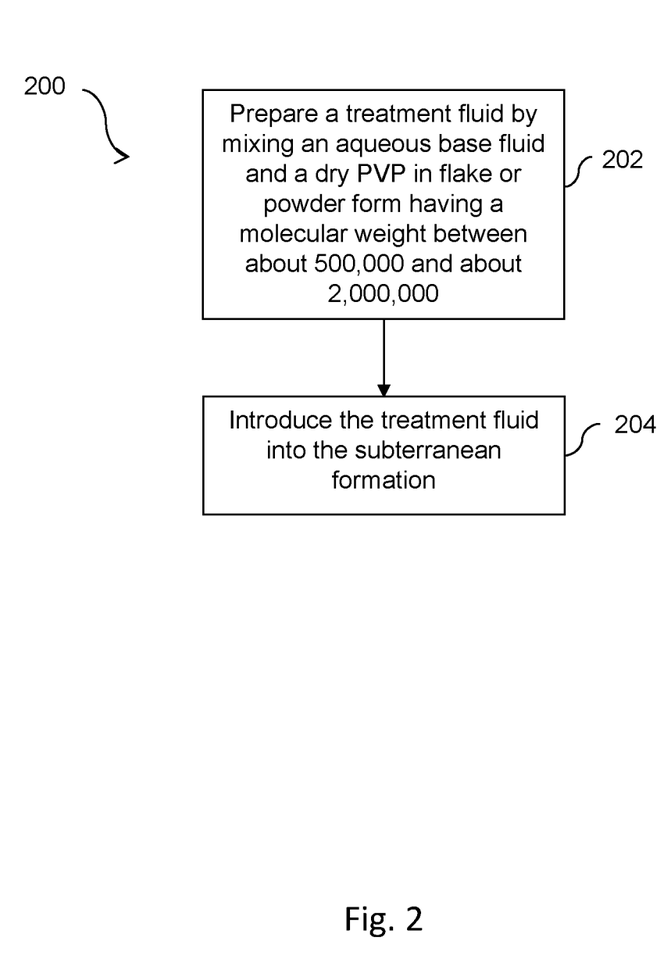

According one or more embodiments, a method of treating a subterranean formation including shale is provided. Turning now to FIG. 2, the method 200 includes preparing a treatment fluid by mixing an aqueous base fluid and a dry PVP in flake or powder form having a molecular weight between about 500,000 and about 2,000,000 in step 202, and introducing, for example, pumping, the treatment fluid into the subterranean formation at step 204.

According to one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

The following examples are illustrative of the compositions and methods discussed above and are not intended to be limiting.

EXAMPLES

Samples Tested

Four samples of dry PERFORMATROL® shale stabilizer were received from Tianjin BoAi NKY. These samples were of varying molecular weight i.e., K60 and K90, and each of these products had two variants in terms of their physical form as powders or flakes. The terms K60 and K90 refer to the viscosity of corresponding 1% polymer solutions. The K60 samples and K90 samples differed in their molecular weight, with the K60 samples having a molecular weight in the range of 240,000-450,000 whereas the K90 samples were in the range of 900,000 to 1,500,000. The sample details are provided in Table 1 below.

TABLE 1

| PRODUCT NAME DETAILS |
| --- |
| Product Name |
| NKY KoVidone ™ K60 (Powder) |
| NKY PVP K60 (Flakes) |
| NKY PVP K90C (Flakes) |
| NKY PVP K90 (Powder) |

Example 1

The four (4) samples were tested initially for their moisture content and density. The results are provided in Table 2 below.

TABLE 2

PRODUCT MOISTURE CONTENT AND DENSITY

| Product | % Moisture | Density (specific gravity) |
| --- | --- | --- |
| NKY PVP K60 (Flakes) | 1.09 | 1.2138 |
| NKY PVP K90C (Flakes) | 0.69 | 1.2274 |
| NKY KoVidone ™ K60 (Powder) | 2.37 | 1.2454 |
| NKY PVP K90 (Powder) | 2.61 | 1.2416 |

These samples were then tested to determine the ease of hydration/solubility as per the following procedure. A base fluid was prepared with 340 grams water and 10.5 grams potassium chloride (KCl). To the base fluid, 3 grams of each powder/flake was added in a beaker on a magnetic stirrer plate. The solubility and presence of any clumping/flocs was observed.

The solubility was tested initially at a low dosage of 3 ppb for all the four samples and based on the performance, the solubility was extended for selected samples at a higher dosage of 8 ppb. The solubility vs. time results are given in Table 3 below.

TABLE 3

PRODUCT SOLUBILITY VS TIME

| Product | Concentration | Solubility time |
| --- | --- | --- |
| NKY PVP K60 (Flakes) | 3 ppb | 25 min |
| NKY PVP K90C (Flakes) | 3 ppb | 55 min |
| NKY KoVidone ™ K60 (Powder) | 3 ppb | 50 min |
| NKY PVP K90 (Powder) | 3 ppb | 75 min |
| NKY PVP K60 (Flakes) | 8 ppb | 40 min |
| NKY PVP K90C (Flakes) | 8 ppb | 70 min |

Example 2

Performance tests for the K60-Flake and K90C-Flake samples were then conducted. The performance tests were carried out by formulating base water based drilling fluids and incorporating the K60-Flake, K90C-Flake and PERFORMATROL® shale stabilizer respectively, into each of the fluids. The base water based fluids (10.0 ppg) were formulated as per the products given in Table 4. These fluids were formulated by adding each of the above ingredient in a 2 oilfield barrel (bbl) mixing cup and mixed using a multimixer. Thus, the fluids included water, a salt (KCl), viscosifiers (AQUAGEL GOLD SEAL®, BARAZAN® D PLUS™), a fluid loss control agent (PAC-L™), representative drill cuttings/solids (HYMOD PRIMA CLAY), a weighting agent (API BARITE), and an oxygen scavenger (BARASCAV™ D™) The order of addition and the mixing time for each of the products is given in Table 4. Once the formulation mixing was completed, the fluid was transferred to an aging cell and conditioned by hot rolling at 150° F. for 16 hours. After the aging was completed, the fluids were tested for shale erosion and shale accretion performance. The details for these two performance tests are summarized as below.

Shale Erosion Test:

An appropriate quantity of shale sample (London Clay) was dried, sized and passed between sieve No. 5 and sieve No. 10. Approximately 1 lab barrel (350 ml) of the drilling fluid was taken in a glass rolling jar and about 30 grams of the sized shale sample collected on the No. 10 sieve was added to it. The glass jar was closed and placed in an oven at 150° F., and hot rolled for 16 hours. After the 16-hour hot roll, the glass jar was cooled down, and its contents were poured onto the No. 10 sieve. The glass jar was carefully rinsed with a KCl solution (3%) and poured onto the No. 10 sieve to remove any residual fluid and shales. The shales retained on the sieve were then carefully washed with additional KCl solution (3%) to remove any adherent mud solids. Further, the shales were briefly rinsed with fresh water to remove any excess salt. These shales were then transferred from the sieve to a clean dry piece of absorbent paper on a flat surface. A brush was used to remove any shale left in the sieve. The shales were then transferred in a pre-weighed Petri dish and then dried in an oven at 105° C. The dried sample was then weighed, and the resulting weight of shale was reported as percent recovery.

Shale Accretion Test:

A clean and dry Monel tube was weighed and then placed in a glass rolling jar containing about 1 lab barrel (350 ml) of the drilling fluid to be tested. The jar was then closed and hot rolled at 150° F. for 5 minutes. Further, about 30 grams of CASING SEAL™ (granular Wyoming sodium bentonite) was added to the jar, and the fluid was mixed with a spatula to evenly disperse the Casing Seal in the fluid. The jar was then hot rolled at 150° F. for an additional 30 minutes. The Monel tube was removed from the fluid in the jar and placed on a screen for a period of about 30 minutes to let the excess fluid run off the tube. The tube was then dried in an oven for 30 minutes at 185° F., and the final weight of the tube recorded. The difference in weight of the tube before and after the tests was the amount of shale adhering to the tube and an indication of the shale accretion capability.

All these fluid formulation details and the performance test findings for shale erosion and shale accretion tests are summarized in Table 4 below.

TABLE 4

PERFORMANCE TESTS FOR K60-FLAKE AND K90C-FLAKE

| Products in order of addition | Conc. | Time (min) | Control PERFORMATROL ® | Mix-1 K60-Flakes | Mix-2 K90C-Flakes |
|---|---|---|---|---|---|
| Water | ppb | — | 316.5 | 316.5 | 316.5 |
| KCl | ppb | 5 | 10.5 | 10.5 | 10.5 |
| AQUAGEL GOLD SEAL ® | ppb | 10 | 5 | 5 | 5 |
| Potassium hydroxide | ppb | 5 | 0.5 | 0.5 | 0.5 |
| PAC-L ™ | ppb | 10 | 2 | 2 | 2 |
| K60-Flake | ppb | 5 | | 1.2 | |
| K90C-Flake | ppb | 5 | | | 1.2 |
| PERFORMATROL ® | ppb | 5 | 10.5 | | |
| BARAZAN ® D PLUS ™ | ppb | 10 | 1 | 1 | 1 |
| HYMOD PRIMA CLAY | ppb | 5 | 20 | 20 | 20 |
| API BARITE | ppb | 5 | 65 | 65 | 65 |
| BARASCAV ™ D ™ | ppb | | 0.1 | 0.1 | 0.1 |
| Mixing & Aging Parameters | | | | | |
| Before Hot Roll (BHR) Mixing | | | Multimixer @ 11500 rpm | | |
| Mixed Volume | | | 2 bbl | | |
| Rolling Temperature | | | 150° F. | | |
| Rolling Time | | | 16 h | | |
| After Hot Roll (AHR) Mixing | | | 5 min on Multimixer | | |
| Mud weight, pounds per gallon (ppg) | | | 10.0 ppg | | |
| Rheology @ 120° F. | | | BHR AHR | BHR AHR | BHR AHR |
| 600 rpm | | | 57  59 | 56  43 | 57  44 |
| 300 rpm | | | 41  42 | 40  29 | 41  30 |
| 200 rpm | | | 32  33 | 30  22 | 32  22 |
| 100 rpm | | | 22  23 | 21  16 | 22  16 |
| 6 rpm | | | 8  7 | 7  6 | 8  6 |
| 3 rpm | | | 6  5 | 6  5 | 6  5 |
| Plastic Viscosity (PV), cP | | | 16  17 | 16  14 | 16  14 |

TABLE 4-continued

PERFORMANCE TESTS FOR K60-FLAKE AND K90C-FLAKE

| Products in order of addition | Conc. | Time (min) | Control PERFORMATROL® | | Mix-1 K60-Flakes | | Mix-2 K90C-Flakes | |
|---|---|---|---|---|---|---|---|---|
| Yield Point (YP), lbs/100 ft² | | | 25 | 25 | 24 | 15 | 25 | 16 |
| 10 sec, lbs/100 ft² | | | 7 | 6 | 7 | 6 | 7 | 6 |
| 10 min, lbs/100 ft² | | | | 8 | | 7 | | 7 |
| PH | | | 10.52 | 9.84 | 11.74 | 10.77 | 11.81 | 10.93 |
| Shale Erosion Test | | | | | | | | |
| Shale Type | | | | London Clay | | London Clay | | London Clay |
| Initial Shale Weight, g | | | | 30 | | 30 | | 30 |
| Final Shale Weight, g | | | | 26.3 | | 23.65 | | 26.38 |
| Shale Retention (%) | | | | 87.67 | | 78.83 | | 87.93 |
| Accretion test | | | | | | | | |
| Shale Type | | | | Casing seal | | Casing seal | | Casing seal |
| Shale amount for test, g | | | | 30 | | 30 | | 30 |
| Initial weight of monel tube, g | | | | 135.64 | | 137.21 | | 135.62 |
| Final weight of monel tube, g | | | | 137.9 | | 149.14 | | 137.23 |
| Shale adhered to monel tube, g | | | | 2.26 | | 11.93 | | 1.61 |
| Accretion (%) | | | | 7.53 | | 39.77 | | 5.37 |

The shale erosion for K90C-Flakes was about 87.93% which was superior compared to the K60-Flakes of about 78.83%. The percent accretion for K90C-Flakes was about 5.37% compared to 39.77% for the K60-Flake sample. Thus, the K90C-Flake sample showed superior performance with respect to the K60-Flake especially for the accretion. The higher molecular weight of the K90C-Flake sample (900,000 to 1,500,000) compared to the K60 (240,000-450,000) seemed to provide superior encapsulation and enhanced shale inhibition performance. Further, the K90C-Flake sample showed comparable performance to that of the control fluid with standard PERFORMATROL® shale stabilizer at 10.5 ppb in terms of shale erosion and a marginal improvement in shale accretion. The fluid rheologies for both the dry PVP samples (K60/K90C) were lower as compared to the control indicating no adverse thickening of fluids.

Example 3

The K90C-Flake was tested at a higher concentration of 2.4 ppb (Mix-3), and the results are given in Table 5 below.

TABLE 5

PERFORMANCE TESTS FOR K90C-FLAKES

| Products in order of addition | Conc. | Time (min) | Mix-2 K90C-Flakes | | Mix-3 K90C-Flakes | |
|---|---|---|---|---|---|---|
| Water | ppb | — | 316.5 | | 316.5 | |
| KCl | ppb | 5 | 10.5 | | 10.5 | |
| AQUAGEL GOLD SEAL® | ppb | 10 | 5 | | 5 | |
| Potassium hydroxide | ppb | 5 | 0.5 | | 0.5 | |
| PAC-L™ | ppb | 10 | 2 | | 2 | |
| K90C-Flake | ppb | 5 | 1.2 | | 2.4 | |
| BARAZAN® D PLUS™ | ppb | 10 | 1 | | 1 | |
| HYMOD PRIMA CLAY | ppb | 5 | 20 | | 20 | |
| API BARITE | ppb | 5 | 65 | | 65 | |
| BARASCAV™ D™ | ppb | 2 | 0.1 | | 0.1 | |
| Mixing & Aging Parameters | | | | | | |
| Before Hot Roll (BHR) Mixing | | | Multimixer @ 11500 rpm | | | |
| Mixed Volume | | | 2 bbl | | | |
| Rolling Temperature | | | 150°F | | | |
| Rolling Time | | | 16 h | | | |
| After Hot Roll (AHR) Mixing | | | 5 min on Multimixer | | | |
| Mud weight, pounds per gallon (ppg) | | | 10.0 ppg | | | |
| Rheology @ 120° F. | | | BHR | AHR | BHR | AHR |
| 600 rpm | | | 57 | 44 | 58 | 49 |
| 300 rpm | | | 41 | 30 | 40 | 34 |
| 200 rpm | | | 32 | 22 | 31 | 27 |
| 100 rpm | | | 22 | 16 | 22 | 19 |

TABLE 5-continued

PERFORMANCE TESTS FOR K90C-FLAKES

| Products in order of addition | Conc. | Time (min) | Mix-2 K90C-Flakes | | Mix-3 K90C-Flakes | |
|---|---|---|---|---|---|---|
| 6 rpm | | | 8 | 6 | 7 | 6 |
| 3 rpm | | | 6 | 5 | 6 | 4 |
| Plastic Viscosity (PV), cP | | | 16 | 14 | 18 | 15 |
| Yield Point (YP), lbs/100 ft$^2$ | | | 25 | 16 | 22 | 19 |
| 10 sec, lbs/100 ft$^2$ | | | | 7 | 6 | 6 |
| 10 min, lbs/100 ft$^2$ | | | | 7 | | 7 |
| PH | | | 11.81 | 10.93 | 11.25 | 10.53 |
| Shale Erosion Test | | | | | | |
| Shale Type | | | | London Clay | | London Clay |
| Initial Shale Weight, g | | | | 30 | | 30 |
| Final Shale Weight, g | | | | 26.38 | | 26.95 |
| Shale Retention (%) | | | | 87.93 | | 89.83 |
| Accretion test | | | | | | |
| Shale Type | | | | Casing seal | | Casing seal |
| Shale amount for test, g | | | | 30 | | 30 |
| Initial weight of monel tube, g | | | | 135.62 | | 136.61 |
| Final weight of monel tube, g | | | | 137.23 | | 137.07 |
| Shale adhered to monel tube, g | | | | 1.61 | | 0.46 |
| Accretion (%) | | | | 5.37 | | 1.53 |

The shale erosion for K90C-Flake at 2.4 ppb (Mix-3) improved only marginally to about 89.83% from 87.93% for 1.2 ppb (Mix-2). The accretion improved to 1.53% for 2.4 ppb (Mix-3) from 5.36% for 1.2 ppb (Mix-2) of K90C-Flake. The rheological profile appeared to be comparable amongst the two concentrations.

Example 4

The solubility of K90C-Flakes was reinvestigated in higher concentrated brines i.e., 9% KCl and 20% sodium chloride (NaCl). The solubility test results for K-90C Flakes (3 ppb) in these two brines are given in Table 6 below.

TABLE 6

SOLUBILITY IN BRINES

| Product | Concentration | solubility time |
|---|---|---|
| Solubility in 9% KCl | | |
| K90C (Flakes) | 3 ppb | 65 min |
| Solubility in 20% NaCl | | |
| K90C (Flakes) | 3 ppb | 70 min |

The solubility time for K90C-Flake (3 ppb) in a previously tested lower concentration of 3% KCl was about 55 minutes. In this case with 9% KCl, the solubility time was about 65 minutes, indicating suitable hydration even in concentrated KCl brine. In the case of 20% NaCl, the solubility time was also about 70 minutes indicating suitable solubility. As described earlier, all of these solubility tests were carried out in a beaker using a magnetic stirrer under medium speed for better control and visualization. The solubility of these products in an actual fluid formulation process (multimixer/field mixing) is expected to be much higher.

Example 5

Another test was carried out to evaluate the performance of the K90C-Flake sample for its shale accretion behavior, however, under stressed test conditions. A higher concentration of casing seal of 45 ppb (instead of 30 ppb standard test amount) was used, and an increased hot roll duration of 2.5 hours (instead of 30 min standard test time) was used. These results are tabulated in Table 7 below.

TABLE 7

ACCRETION TESTS OF K90C-FLAKE UNDER STRESSED TEST CONDITIONS

| Products in order of addition | Conc. | Time (min) | Mix-2-Re K90C-Flake | Mix-4 PERFORMATROL® |
|---|---|---|---|---|
| Water | ppb | — | 316.5 | 316.5 |
| KCl | ppb | 5 | 10.5 | 10.5 |
| AQUAGEL GOLD SEAL ® | ppb | 10 | 5 | 5 |
| Potassium hydroxide | ppb | 5 | 0.5 | 0.5 |
| PAC-L ™ | ppb | 10 | 2 | 2 |
| K90C-Flake | ppb | 5 | 1.2 | |
| PERFORMATROL® | ppb | 5 | | 10.5 |

TABLE 7-continued

ACCRETION TESTS OF K90C-FLAKE UNDER STRESSED TEST CONDITIONS

| Products in order of addition | Conc. | Time (min) | Mix-2-Re K90C-Flake | | Mix-4 PERFORMATROL ® | |
|---|---|---|---|---|---|---|
| BARAZAN ® D PLUS ™ | ppb | 10 | 1 | | 1 | |
| HYMOD PRIMA CLAY | ppb | 5 | 20 | | 20 | |
| API BARITE | ppb | 5 | 65 | | 65 | |
| BARASCAV ™ D ™ | ppb | | 0.1 | | 0.1 | |
| Mixing & Aging Parameters | | | | | | |
| Before Hot Roll (BHR) Mixing | | | Multimixer @ 11500 rpm | | | |
| Mixed Volume | | | 2 bbl | | | |
| Rolling Temperature | | | 150°F | | | |
| Rolling Time | | | 16 h | | | |
| After Hot Roll (AHR) Mixing | | | 5 min on Multimixer | | | |
| Mud weight, pounds per gallon (ppg) | | | 10.0 ppg | | | |
| Rheology @ 120 °F | | | BHR | AHR | BHR | AHR |
| 600 rpm | | | 55 | 45 | 57 | 54 |
| 300 rpm | | | 39 | 32 | 41 | 38 |
| 200 rpm | | | 31 | 22 | 32 | 29 |
| 100 rpm | | | 21 | 17 | 23 | 21 |
| 6 rpm | | | 8 | 7 | 8 | 6 |
| 3 rpm | | | 6 | 5 | 6 | 5 |
| Plastic Viscosity (PV), cP | | | 16 | 13 | 16 | 16 |
| Yield Point (YP), lbs/100 ft$^2$ | | | 23 | 19 | 25 | 22 |
| 10 sec, lbs/100 ft$^2$ | | | 7 | 5 | 6 | 5 |
| 10 min, lbs/100 ft$^2$ | | | | 7 | | 7 |
| PH | | | 10.64 | 10.13 | 10.85 | 10.17 |
| Shale Type | | | Casing seal | | Casing seal | |
| Shale amount for test, g | | | 45 | | 45 | |
| Test time | | | 2.5 h | | 2.5 h | |
| Initial weight of monel tube, g | | | 135.62 | | 137.24 | |
| Final weight of monel tube, g | | | 136.87 | | 138.41 | |
| Shale adhered to monel tube, g | | | 1.25 | | 1.17 | |
| % Accretion | | | 2.78 | | 2.6 | |

Under these stressed conditions, the shale accretion for K90C-Flake at 1.2 ppb was found to be about 2.78%. This was similar to that observed for the standard PERFORMATROL® shale stabilizer at 10.5 ppb which was about 2.60%.

The K90C-Flake sample was evaluated for rheological stability, shale erosion, and shale accretion, and showed comparable performance to standard PERFORMATROL® shale stabilizer.

Example 6

Two freshwater solutions of xanthan gum were prepared in 350-mL volumes. One gram of K90C-Flakes was added to the second sample, and the rheological properties were compared after mixing. Addition of this PVP had a very minor impact to the plastic viscosity/yield point and low shear readings. For worthwhile comparisons of shale erosion results, fluids should have matching yield point and 100-rpm readings within a small range. Here these two key parameters matched very well in the two samples, and the shale erosion test showed excellent stabilization of the clay in the sample with added PVP.

TABLE 8

PERFORMANCE TESTS FOR K90C-FLAKES IN XANTHAN GUM SOLUTION

| | Conc. | CONTROL | K90C |
|---|---|---|---|
| Fresh water | bbl | 1 | 1 |
| CAUSTIC SODA | ppb | 0.1 | 0.1 |
| BARAZAN ® D PLUS ™ | ppb | 1.5 | 1.5 |
| K90C (Flakes) | ppb | | 1 |
| Mixing Parameters | | | |
| | | Multimixer @ 11500 rpm | Multimixer @ 11500 rpm |
| Mixed Volume | | 1 bbl | 1 bbl |
| Viscometer FANN 35SA | | | |
| Rheology @ 120° F. | | 120° F. | 120° F. |
| 600 rpm | | 23 | 27 |
| 300 rpm | | 19 | 21 |
| 200 rpm | | 17 | 18 |
| 100 rpm | | 14 | 15 |
| 6 rpm | | 8 | 8 |
| 3 rpm | | 6 | 7 |
| Plastic Viscosity (PV) | cP | 4 | 6 |
| Yield Point (YP) | lbs/100 ft$^2$ | 15 | 15 |
| 10 second gel strength | lbs/100 ft$^2$ | 8 | 8 |

TABLE 8-continued

PERFORMANCE TESTS FOR K90C-FLAKES IN XANTHAN GUM SOLUTION

|  | Conc. | CONTROL | K90C |
|---|---|---|---|
| Shale Erosion Test @150° F./16 hrs | | | |
| Shale Type | | London Clay | London Clay |
| Initial Shale Weight, g | | 30 | 30 |
| Final Shale Weight, g | | 3.74 | 25.79 |
| Shale Retention (%) | | 12.5 | 86.0 |

Example 7

Five test fluids were prepared using inhibitor materials and a freshwater base. A control fluid without added shale inhibitor was included for comparison. The samples were prepared by mixing the components in a multimixer in approximately 350-mL volumes each. Fluid A represented the control, while Fluids B-F contained different inhibitor types. The inhibitors included dry shale inhibitor K90C-Flakes; dry shale inhibitor EZ MUD® DP (dry PHPA copolymer); dry shale inhibitor BDF™-677 (guanidine-based compound); PERFORMATROL® shale stabilizer (high molecular weight PVP in suspension); and CLAY GRABBER® shale stabilizer (high molecular weight polyacrylamide emulsion).

The product shelf life for these and similar suspensions and emulsion materials is typically limited to 6-12 months depending on the storage conditions. Although they might possibly be reworked by mixing and blending, this is not practical in typical warehouse conditions. Dry shale inhibitors such as the ones compared here can exhibit stable shelf life for 2-3 years with no issues.

As in Example 6, the key rheological parameters matched well across the group of samples to minimize any variations due to fluid viscosity. The control reached 63% recovery of shale. BDF™-677 guanidine-based compound had the lowest shale recovery at 83%, while the two polyacrylamide-based inhibitors had 87%. Both the liquid PERFORMATROL® shale inhibitor and K90C-Flakes showed high recovery values of 94% mass. Since the inhibitor additives in Fluids D-F also contributed to increases in the fluid viscosity, the amounts of BARAZAN® D PLUS were reduced accordingly.

Example 8

To further evaluate inhibitor options, five additional test fluids were prepared using the same selection of inhibitor materials and a KCl brine base. The 10.5 lb/bbl concentration of KCl corresponded to an industry standard of 3% by weight per volume. A control fluid without added shale inhibitor (Fluid 2A) was included for comparison.

TABLE 9

PERFORMANCE TESTS WITH DIFFERENT SHALE INHIBITORS

|  | Fluid A | Fluid B | Fluid C | Fluid D | Fluid E | Fluid F |
|---|---|---|---|---|---|---|
| Fresh water, ppb | 294 | 286 | 294 | 294 | 294 | 294 |
| Caustic Soda, ppb | 0.1 | 0.1 | 0.1 | 0.1 | 0.1 | 0.1 |
| Soda Ash, ppb | 0.3 | 0.3 | 0.3 | 0.3 | 0.3 | 0.3 |
| BARAZAN ® D PLUS, ppb | 1.7 | 1.5 | 1.5 | 1.15 | 1.15 | 0.75 |
| DEXTRID ® LTE, ppb | 2 | 2 | 2 | 2 | 2 | 2 |
| PERFORMATROL ®, ppb | | 9.09 | | | | |
| PVP K90C Flakes, ppb | | | 1 | | | |
| EZ MUD ® DP, ppb | | | | 1 | | |
| BDF ™-677, ppb | | | | | 3.5 | |
| CLAY GRABBER ®, ppb | | | | | | 2 |
| Barite, ppb | 140 | 140 | 140 | 140 | 140 | 140 |
| Rheological properties @ 120° F., after Hot Roll 150° F./16 hours | | | | | | |
| 600 rpm | 45 | 50 | 48 | 59 | 42 | 55 |
| 300 rpm | 37 | 38 | 38 | 45 | 34 | 44 |
| 200 rpm | 33 | 33 | 32 | 39 | 28 | 38 |
| 100 rpm | 27 | 25 | 26 | 31 | 21 | 30 |
| 6 rpm | 10 | 9 | 10 | 11 | 9 | 10 |
| 3 rpm | 7 | 7 | 8 | 8 | 7 | 8 |
| Plastic Viscosity, cP | 8 | 12 | 10 | 14 | 8 | 11 |
| Yield point, lb/100 ft$^2$ | 29 | 26 | 28 | 31 | 26 | 33 |
| PH | 9.3 | 9.7 | 9.6 | 9.7 | 9.7 | 9.8 |
| Shale Erosion Testing: Tested for 16 hours Exposure/150° F. | | | | | | |
| London clay dispersed, g | 30 | 30 | 30 | 30 | 30 | 30 |
| London clay recovered, g | 18.79 | 28.28 | 28.21 | 25.97 | 24.82 | 25.98 |
| Recovery, % | 63 | 94 | 94 | 87 | 83 | 87 |

TABLE 10

ADDITIONAL PERFORMANCE TESTS WITH DIFFERENT SHALE INHIBITORS

|  | Fluid 2A | Fluid 2B | Fluid 2C | Fluid 2D | Fluid 2E | Fluid 2F |
|---|---|---|---|---|---|---|
| Fresh water, ppb | 309.1 | 300.4 | 308.2 | 308.4 | 306.8 | 307.5 |
| KCl, ppb | 10.5 | 10.5 | 10.5 | 10.5 | 10.5 | 10.5 |
| Caustic Soda, ppb | 0.1 | 0.1 | 0.1 | 0.1 | 0.1 | 0.1 |
| Soda Ash, ppb | 0.3 | 0.3 | 0.3 | 0.3 | 0.3 | 0.3 |
| BARAZAN® D PLUS, ppb | 1.7 | 1.5 | 1.5 | 1.15 | 1.35 | 1.15 |
| DEXTRID® LTE, ppb | 2 | 2 | 2 | 2 | 2 | 2 |
| PERFORMATROL®, ppb |  | 9.09 |  |  |  |  |
| PVP K90C Flakes, ppb |  |  | 1 |  |  |  |
| EZ MUD® DP, ppb |  |  |  | 1 |  |  |
| BDF-677, ppb |  |  |  |  | 3.5 |  |
| CLAY GRABBER®, ppb |  |  |  |  |  | 2 |
| Barite, ppb | 140 | 140 | 140 | 140 | 140 | 140 |
| Rheological properties @ 120° F., after Hot Roll 150° F./16 hours | | | | | | |
| 600 rpm | 54 | 56 | 55 | 57 | 44 | 51 |
| 300 rpm | 44 | 43 | 42 | 43 | 35 | 39 |
| 200 rpm | 39 | 36 | 35 | 35 | 29 | 33 |
| 100 rpm | 29 | 25 | 24 | 26 | 22 | 23 |
| 6 rpm | 14 | 8 | 9 | 8 | 9 | 8 |
| 3 rpm | 12 | 7 | 7 | 6 | 7 | 6 |
| Plastic Viscosity, cP | 10 | 13 | 13 | 14 | 9 | 12 |
| Yield point, lb/100 ft$^2$ | 34 | 30 | 29 | 29 | 26 | 27 |
| PH | 9.35 | 9.7 | 9.6 | 9.6 | 9.6 | 9.6 |
| Shale Erosion Testing: Tested for 16 hours Exposure/150° F. Temperature | | | | | | |
| London clay dispersed, g | 30 | 30 | 30 | 30 | 30 | 30 |
| London clay recovered, g | 25.57 | 29.05 | 28.98 | 28.85 | 26.79 | 28.4 |
| Recovery, % | 85 | 97 | 97 | 96 | 89 | 95 |
| Accretion test: Tested for 30 minutes/150° F. Temperature | | | | | | |
| Shale (Casing Seal) wt, g | 30 | 30 | 30 | 30 | 30 | 30 |
| Initial wt of monel tube, g | 117.69 | 117.04 | 117.07 | 117.04 | 117.07 | 117.04 |
| Final wt of monel tube, g | 125.21 | 118.4 | 118.69 | 119.73 | 118.88 | 120.06 |
| Shale adhered to tube, g | 7.52 | 1.36 | 1.62 | 2.69 | 1.81 | 3.02 |
| % Accretion | 25.1 | 4.5 | 5.4 | 9.0 | 6.0 | 10.1 |

The key rheological parameters for these fluids matched well across the group to minimize variations in shale-fluid test results. In this case, the control fluid reached 85% recovery by virtue of the added KCl.

For Fluid 2E, the BDF™-677 guanidine-based compound again showed a lower recovery value than the other inhibitors. This was measured at 89% and only slightly improved from the control. The other inhibitors all achieved 95-97% mass, indicating a high degree of erosion control.

Accretion testing was also conducted on this series of fluids. This revealed poor performance with the control fluid since it had 25% of shale mass sticking to the tube. The polyacrylamide-type inhibitors, EZ MUD® DP dry PHPA copolymer and CLAY GRABBER® shale stabilizer, attained accretion values of 9 and 10% respectively. Fluid 2E with the BDF™-677 guanidine-based compound had improved accretion over these fluids, with 6% mass sticking. The lowest accretion values obtained were with the two PVP-based inhibitor materials. PERFORMATROL® shale stabilizer showed 4.5% while K90C-Flakes showed 5.4%. Given the experimental error associated with this test method, these values could be considered the same and superior to the other inhibitors tested.

In terms of formulating fluids for drilling reactive formations, there is an ongoing need for high-efficiency inhibitors that may serve multiple functions within fluids. Shale erosion and accretion are known to be two of the most prevalent challenges that these additives must meet in order to provide adequate performance for drilling. As the previous result sets illustrate, most inhibitor additives function well at only one of these two functions. For example, EZ MUD® DP dry PHPA copolymer provided an acceptable level of shale recovery when tested in freshwater and a high degree of control with KCl brine. However, its accretion prevention capability was poor compared with the BDF™-677 guanidine-based compound and the PVP-based inhibitors.

Conversely, the BDF™-677 guanidine-based compound lagged in shale recovery while it achieved acceptable to good accretion control with KCl brine. Those of ordinary skill in the art would recognize the need for binary or tertiary combinations of single-function inhibitors to satisfy multiple well requirements for shale control. The advantage of the dry PVP flakes having a middle range molecular weight is apparent since both accretion and erosion control are achieved with a very small mass of polymer. This improves logistical capabilities to service drilling fluids in remote locations, and drastically simplifies the onsite maintenance required. In view of these benefits, the dry PVP flakes have been shown to be the most efficacious material available for shale inhibition.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of treating a subterranean formation comprising shale, the method comprising:
   providing dry polyvinyl pyrrolidone (PVP) at a wellsite, wherein the dry PVP has a molecular weight between about 900,000 to about 2,000,000 and less than 2% moisture;
   preparing a treatment fluid by mixing, at the wellsite, an aqueous base fluid and the dry PVP; and
   introducing the treatment fluid in the subterranean formation,
   wherein the PVP is in flake form and has a reduced solubility time in comparison to a powder form, and
   wherein the treatment fluid provides superior encapsulation and enhanced shale inhibition performance relative to a treatment fluid not having the dry PVP having the molecular weight between about 900,000 to about 2,000,000 and less than 2% moisture.

2. The method of claim 1, wherein the PVP is present in the treatment fluid in an amount sufficient to inhibit degradation of the shale or prevent accretion of the shale.

3. The method of claim 2, wherein the PVP is present in the treatment fluid in an amount in a range of about 0.04 pounds per barrel (ppb) to about 10 ppb of the treatment fluid.

4. The method of claim 3, wherein the PVP is present in the treatment fluid in an amount in a range of about 1 ppb to about 8 ppb.

5. The method of claim 1, wherein the treatment fluid further comprises a salt.

6. The method of claim 5, wherein the salt comprises potassium chloride, calcium chloride, sodium chloride, potassium formate, calcium bromide, potassium carbonate, or a mixture thereof.

7. The method of claim 1, wherein the aqueous base fluid comprises fresh water.

8. The method of claim 1, wherein the treatment fluid comprises a drilling fluid.

9. The method of claim 1, wherein the PVP has a molecular weight between about 900,000 to about 1,500,000.

10. The method of claim 1, wherein the treatment fluid provides an increased shale retention and/or a decreased accretion relative to a treatment fluid comprising an aqueous PVP shale inhibitor.

11. The method of claim 1, wherein the PVP flakes have a reduced moisture and/or a reduced specific gravity relative to the PVP powder.

12. The method of claim 1, wherein the dry PVP has less than 1% moisture.

13. A method of drilling a well in a subterranean formation comprising shale, the method comprising:
    preparing a drilling fluid, at a wellsite, by mixing an aqueous base fluid and a dry polyvinyl pyrrolidone (PVP) in flake form having a molecular weight between about 900,000 to about 2,000,000, and less than 2% moisture;
    introducing the drilling fluid into a well bore in contact with a drill bit and the subterranean formation; and
    using the drilling fluid to drill in at least a portion of the subterranean formation,
    wherein the PVP is in flake form and has a reduced solubility time in comparison to a powder form, and
    wherein the drilling fluid provides superior encapsulation and enhanced shale inhibition performance relative to a drilling fluid not having the dry PVP having the molecular weight between about 900,000 to about 2,000,000 and less than 2% moisture.

14. The method of claim 13, wherein the PVP is present in the drilling fluid in an amount in a range of about 0.04 pounds per barrel (ppb) to about 10 ppb of the drilling fluid.

15. The method of claim 13, wherein the drilling fluid further comprises a salt.

16. The method of claim 15, wherein the salt comprises potassium chloride, calcium chloride, sodium chloride, potassium formate, calcium bromide, potassium carbonate, or a mixture thereof.

17. The method of claim 13, wherein the PVP has a molecular weight between about 900,000 to about 1,500,000.

18. The method of claim 13, wherein the dry PVP has less than 1% moisture.

* * * * *